(12) United States Patent
Liu (10) Patent No.: US 8,405,963 B2
(45) Date of Patent: Mar. 26, 2013

(54) DISPLAY AND DAMPING MEMBER ATTACHED TO DISPLAY

(75) Inventor: Hokshing Liu, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 65 days.

(21) Appl. No.: 13/201,183

(22) PCT Filed: Oct. 16, 2009

(86) PCT No.: PCT/JP2009/067915
§ 371 (c)(1),
(2), (4) Date: Aug. 22, 2011

(87) PCT Pub. No.: WO2010/095310
PCT Pub. Date: Aug. 26, 2010

(65) Prior Publication Data
US 2011/0310545 A1    Dec. 22, 2011

(30) Foreign Application Priority Data

Feb. 19, 2009  (JP) .................................. 2009-037084

(51) Int. Cl.
*H05K 5/00* (2006.01)
*H05K 7/00* (2006.01)

(52) U.S. Cl. ......... 361/679.21; 361/679.22; 361/679.26; 361/679.3

(58) Field of Classification Search ............. 361/679.01, 361/679.21, 679.22, 679.26, 679.3; 349/56, 349/58
See application file for complete search history.

(56) References Cited

U.S. PATENT DOCUMENTS

| | | | | |
|---|---|---|---|---|
| 6,317,316 B1 * | 11/2001 | Bentley et al. | ........... | 361/679.22 |
| 6,494,429 B2 * | 12/2002 | Tajima | ........... | 248/473 |
| 6,507,484 B2 * | 1/2003 | Fukuyoshi | ........... | 361/679.26 |
| 7,002,792 B2 * | 2/2006 | Han et al. | ........... | 361/679.21 |
| 7,405,925 B2 * | 7/2008 | Sung | ........... | 361/679.27 |
| 7,576,975 B2 * | 8/2009 | Tai et al. | ........... | 361/679.21 |
| 2004/0156168 A1 * | 8/2004 | LeVasseur et al. | ........... | 361/681 |

FOREIGN PATENT DOCUMENTS

| | | |
|---|---|---|
| JP | 6-50035 U | 7/1994 |
| JP | H11-143396 A | 5/1999 |
| JP | 2002-107696 A | 4/2002 |
| WO | 00/07169 A1 | 2/2000 |

OTHER PUBLICATIONS

International Search Report (ISR) issued in PCT/JP2009/067915 (International application) mailed in Jan. 2010 for Examiner consideration.

* cited by examiner

*Primary Examiner* — Anthony Haughton
(74) *Attorney, Agent, or Firm* — Chen Yoshimura LLP (57) ABSTRACT

A display wherein a damping member (50) disposed between the front surface of the periphery of a display panel and the rear surface of a bezel has elastic body parts (52) each made of an elastic body and a conductive covering part (54) that covers the elastic body parts (52) and that has conductivity. Openings (56) from which the elastic body parts (52) are exposed are formed in a part of the surface (54*b*) of the damping member (50) that faces the rear surface of the bezel and/or in a part of the surface (54*a*) thereof that faces the front surface of the periphery of the display panel. The elastic body parts (52) exposed from the openings (56) are configured in such a manner as to be brought into contact with the rear surface of the bezel and/or the front surface of the periphery of the display panel.

6 Claims, 5 Drawing Sheets

DISPLAY AND DAMPING MEMBER ATTACHED TO DISPLAY

TECHNICAL FIELD

The present invention relates to a display device having a display panel and a damping member (gasket) provided in the display device which excels in function of preventing EMI and ESD.

BACKGROUND ART

In recent years, as a display device for a television, a personal computer, or the like, a liquid crystal display device typically having a rectangular liquid crystal display panel is used widely.

In this type of display devices, typically, a rim shaped bezel is disposed on a front surface side of the display panel, and also a rim shaped frame is disposed on a rear surface side of the panel. These bezel and frame are each formed into a frame form shape rectangularly surrounding a display area (active area) in the center of the display panel, and sandwiching and supporting a rectangular periphery of the panel from both front and back sides of the display panel. Also, in such display devices, typically, a damping member (also referred to as a cushion material) for damping a vibrational impact to the panel is disposed between the front surface of the display panel and the rear surface of the bezel.

Here, in electronic devices such as the display devices described above, a counter measure to prevent (lower) EMI (Electromagnetic Interference) and/or ESD (Electrostatic Discharge) is provided. For example, for the above described damping member, a damping member (gasket) having, in addition to the primary damping capability, a function as a conductive member for preventing EMI and/or ESD is being proposed.

For example, in Patent Document 1, a liquid crystal display device having a configuration in which a gasket is disposed between a printed circuit board of the liquid crystal panel and a metallic shield frame (that is a bezel) on the front surface side of the panel is described. The gasket described in Patent Document 1 has an insulating member and a conductive member inside the insulating member, and the upper surface and the lower surface (two surfaces facing each other among outer peripheral surfaces of the insulating member) of the gasket having the conductive fabric disposed are in contact with the printed circuit board and the metallic shield frame.

RELATED ART DOCUMENTS

Patent Documents

Patent Document 1: Japanese Patent Application Laid-Open Publication No. H11-143396

SUMMARY OF THE INVENTION

Problems to be Solved by the Invention

However, a conductive fabric, such as those described in Patent Document 1, has a small surface frictional coefficient and is easy to slip. Therefore, if a gasket having such a conductive fabric is disposed between the metallic shield frame (bezel) and the display panel, the gasket slips out of the placed position even by a slight vibration. Thus, such a gasket may not function as a cushion member or a conductive member. In order to fix (position) such a gasket at a predetermined position on the rear surface of the shield frame (or the front surface of the display panel), the gasket needs to be attached using a double sided tape, an adhesive or the like. If the number of steps for affixing the gasket increases, an increase in costs and a decrease in work efficiency may occur. Particularly, if the gasket is fixed (adhered) to the display panel, then when the display device is disassembled, for example, it becomes difficult to remove the gasket from the panel. Thus, it is not preferable.

Thus, the present invention is made in view of the above-mentioned points. Its main object is to provide a damping member (gasket) disposed between a display panel and a bezel on the front surface side of the display panel to damp a vibrational impact to the display panel, which is unlikely to slip out of a predetermined position, and which has a function of effectively preventing EMI and/or ESD. Another object is to provide a display device having such a damping member (gasket).

Means for Solving the Problems

In order to realize the above objects, a display device provided by the present invention has a display panel and a frame shaped bezel attached surrounding the periphery of the panel on a front surface side of the display panel. Also, in the display device, a damping member (gasket) is disposed between the front surface of the periphery of the display device and a rear surface of the bezel facing the front surface. The damping member includes an elastic body part made of an elastic body, and a conductive covering part, which is a covering part covering the elastic body part and has conductivity. Of the damping member, on at least a part of a surface on a side facing the rear surface of the bezel and/or a part of a surface on a side facing the front surface of the periphery of the display panel, an opening exposing the elastic body part is formed. Here, the damping member is characterized in that it is configured in such a way so that when the damping member is sandwiched and disposed between the front surface of the periphery of the display panel and the rear surface of the bezel, the elastic body part exposed from the opening can come in contact with the rear surface of the bezel and/or the front surface of the periphery of the display panel.

In the display device of the present invention, the damping member provided in the display device and disposed between the front surface of the periphery of the display panel and the rear surface of the bezel has the elastic body part. Because of this, the damping member can dampen the vibrational impact to the display panel by exerting its primary damping capability.

Also, typically, a surface of the elastic body part made of the elastic body has a higher frictional coefficient than a surface of the conductive covering part (for example, made of a conductive fabric). Here, the damping member has the opening exposing the elastic body part. When the damping member is disposed between the front surface of the periphery of the display panel and the rear surface of the bezel, the elastic body part exposed from the opening can come in contact with the rear surface of the bezel and/or the front surface of the periphery of the display panel. Because of this, a frictional force at a contact area of the elastic body part and the front surface of the periphery of the display panel is large, and the damping member is unlikely to slip out of the disposed position.

Further, such a damping member has the conductive covering part covering the elastic body part (typically, covering the outer peripheral side surface of the elastic body part in a rolled up manner). Because of this, the display panel and the bezel (typically metallic) are electrically connected through the conductive covering part, and a conductive path from the display panel to the bezel is formed. Therefore, this damping member can effectively prevent EMI and/or ESD.

Accordingly, the display device of the present invention can realize a suitable display device having a damping member, which, in addition to its primary damping capability to damp a vibrational impact to the display panel, has functionality of preventing EMI and/or ESD without slipping out of a predetermined position.

In a preferred embodiment of the display device disclosed herein, in the periphery of the display panel, at least one electronic part is provided in a region in contact with or close to the damping member sandwiched and disposed between the front surface of the periphery and the rear surface of the bezel. Here, the damping member is configured in such a way that when the damping member is sandwiched and disposed between the front surface of the periphery of the display panel and the rear surface of the bezel, the conductive covering part comes in contact with or is adjacent to the electronic part, and the opening is not in contact with the electronic part.

In the display device of such a configuration, the damping member is configured (disposed) so that its conductive covering part is in contact with or adjacent to the electronic part. Because of this, for example, electrical charges accumulated on the front surface of the display panel can flow to the bezel through the conductive covering part with a higher probability. Thus, damages to the electronic part due to the electric charges flowing into the electronic part can securely be avoided. Accordingly, by the display device of such a configuration, the function of preventing EMI and/or ESD can be performed even more effectively.

In an even more preferred embodiment of the display device having a configuration in which an electronic part is provided in a region in contact with or close to the damping member, a plurality of the openings are formed at positions not touching the electronic part on the surface of the side of the damping member facing the front surface of the periphery of the display panel. Here, the damping member has a configuration in which the elastic body parts respectively exposed from the plurality of openings can come in contact with the front surface of the periphery of the display panel when it is sandwiched and disposed between the front surface of the periphery of the display panel and the rear surface of the bezel. In the display device of such a configuration, the damping member has a plurality of the openings. Because of this, the damping member is even more unlikely to slip out of the predetermined position. Also, a plurality of electronic parts can be protected from damages due to EMI and/or ESD by using one damping member, and the number of damping members used can be reduced.

The present invention provides, in another aspect, a damping member to be included in display devices disclosed herein. In the display device having a display panel and a frame shape bezel attached surrounding the periphery of the panel on a front surface side of the display panel, such a damping member is attached between the front surface of the periphery of the display panel and a rear surface of the bezel facing the front surface. Further, such a damping member has an elastic body part made of an elastic body and a conductive covering part, which is a covering part covering the elastic body part and has conductivity. Also, of the damping member, on at least a part of a surface of a side facing the rear surface of the bezel and/or a part of a surface of a side facing the front surface of the periphery of the display panel, an opening exposing the elastic body part is formed. Here, such a damping member is configured in such a way that when the damping member is sandwiched and disposed between the front surface of the periphery of the display panel and the rear surface of the bezel, the elastic body part exposed from the opening can come in contact with the rear surface of the bezel and/or the front surface of the periphery of the display panel.

By using the damping member of the display device in the present invention, a suitable display device, which, in addition to its primary damping capability to damp a vibrational impact to the display panel, is unlikely to slip out of the predetermined position and has the function of preventing EMI and/or ESD, is realized.

In a preferred embodiment of the damping member for the display device disclosed herein, the damping member is attached to a display device in which at least one electronic part is provided on the periphery of the display panel. Further, such a damping member is configured in such a way that when the damping member is sandwiched and disposed between the front surface of the periphery of the display panel and the rear surface of the bezel, the conductive covering part and the electronic part are in contact or close to each other and the opening is not in contact with the electronic part.

By using the damping member in the display device of such a configuration, a suitable display device in which prevention capability of EMI and/or ESD is even more improved, and damages to the electronic part can be more effectively prevented is provided.

In an even more preferred embodiment of the damping member to be attached to the display device having at least one electronic part provided on the periphery of the display panel, a plurality of the openings are formed on the surface of the side facing the front surface of the periphery of the display panel in positions not in contact with the electronic part. This damping member is configured in such a way that when sandwiched and disposed between the front surface of the periphery of the display panel and the rear surface of the bezel, the elastic body parts respectively exposed from the plurality of openings can come in contact with the front surface of the periphery of the display panel.

Use of the damping member in the display device of such a configuration realizes a preferred display device in which such a damping member is even more unlikely to slip out of the predetermined position, damages to the plurality of electronic parts due to EMI and/or ESD are prevented, and the number of the damping members used is reduced.

DETAILED DESCRIPTION OF EMBODIMENTS

Referring to the drawings, the following describes several preferred embodiments of the present invention. Here, the subject matters necessary to embody the present invention (for example, method of configuring or constructing a liquid crystal panel, configuration of a light source provided in a liquid crystal display device, and the like) that are outside of the subject matters particularly discussed in the present specification (for example, bezel configuration) can be understood as design items to one of ordinary skill in the art based on the conventional technology in the art. The present invention can be embodied by what are disclosed in the present specification and techniques in common knowledge in the art.

Figure 1:
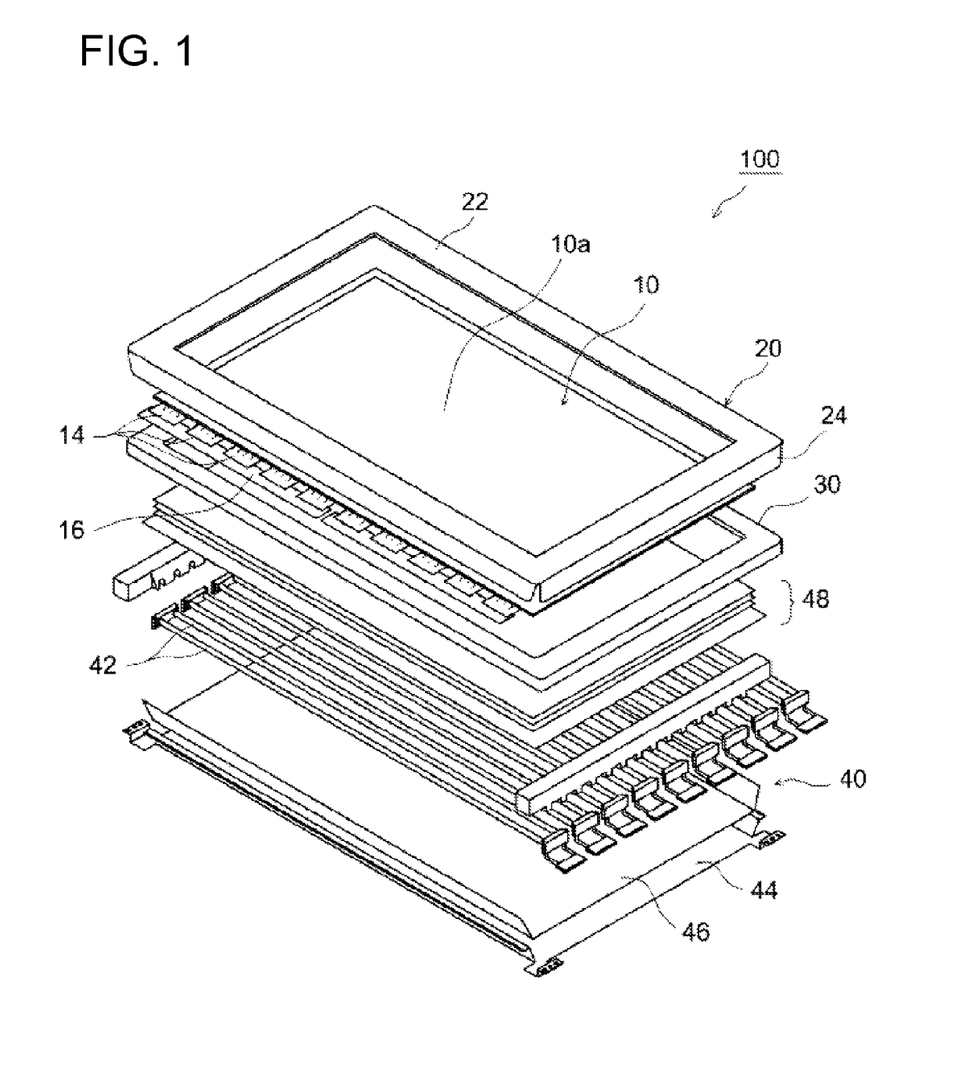
FIG. 1 is an exploded perspective view showing schematically a configuration of a liquid crystal display device according to an embodiment of the present invention.
Figure 2:
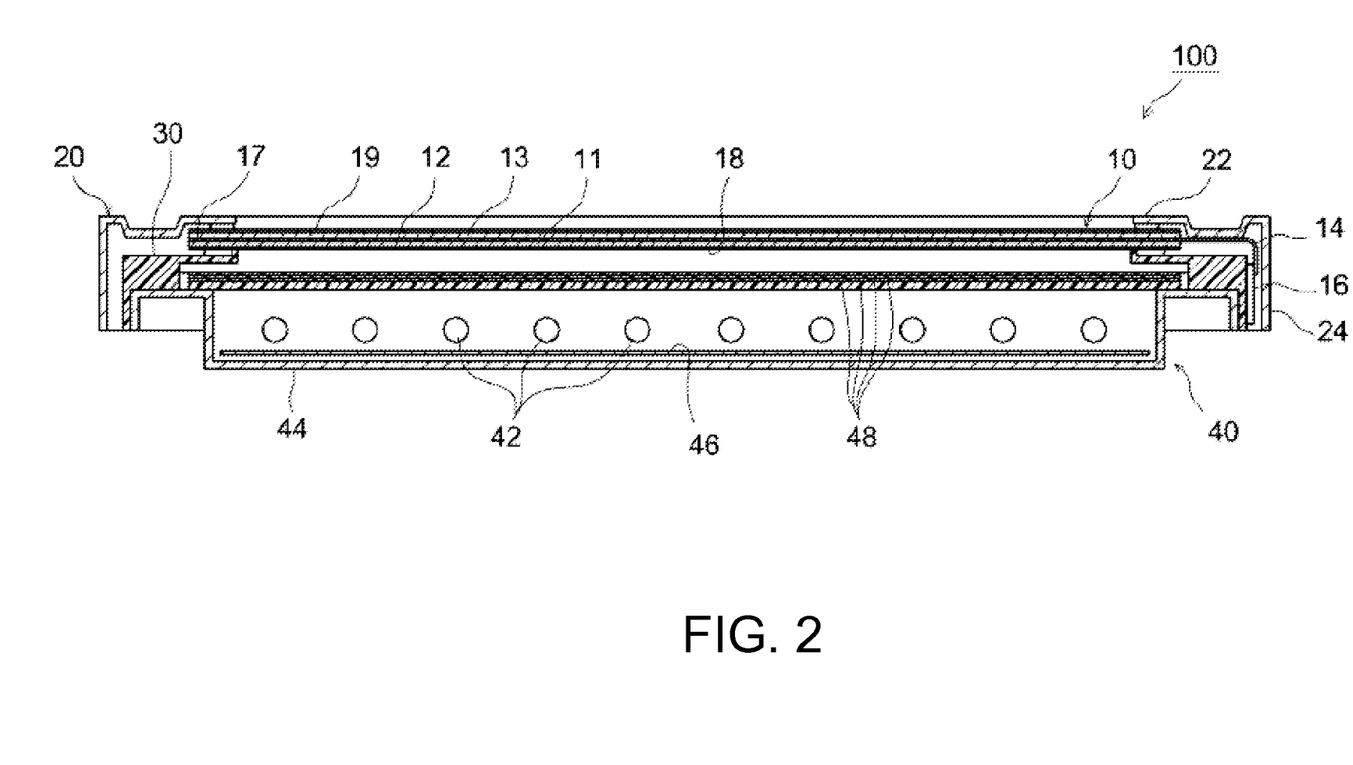
FIG. 2 is a schematic cross sectional view showing a configuration of a liquid crystal display device according to an embodiment of the present invention.
Figure 3:
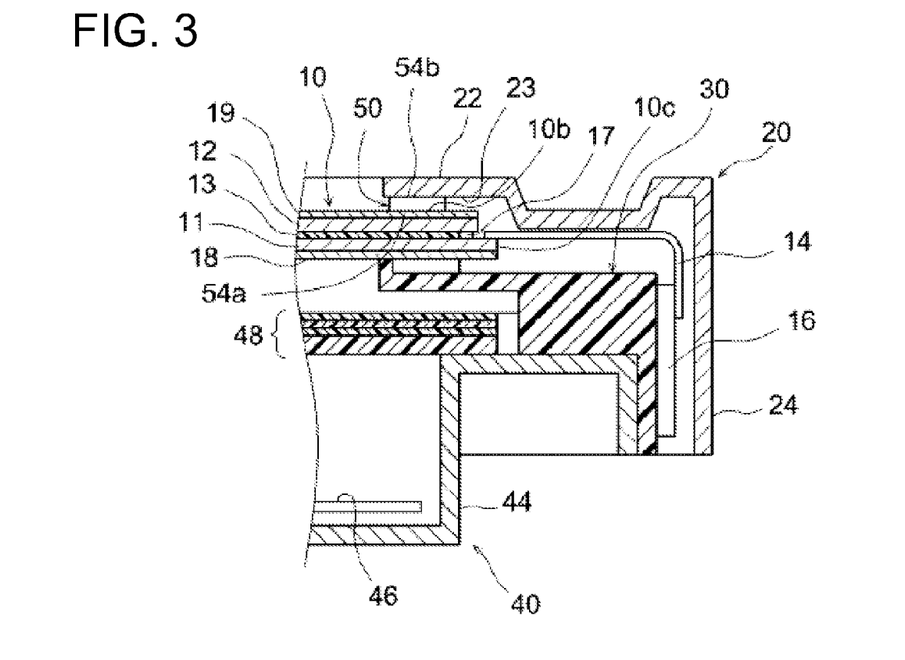
FIG. 3 is a schematic cross sectional view showing a periphery of a liquid crystal panel in a liquid crystal display device according to an embodiment of the present invention.

Referring to FIG. 1 to FIG. 3, a display device of a preferred embodiment of the present invention is described using an active matrix type (TFT type) liquid crystal display device 100 provided with a liquid crystal panel 10 as a display panel, as an example. Here, in the following figures, the same reference characters are assigned to the members and parts performing the same functionalities, and a redundant description may be omitted or simplified. Also, a dimensional relationship (length, width, thickness, and the like) in each of the figures is not necessarily a correct reflection of an actual dimensional relationship. Also, in the following description, the side facing the viewers of the liquid crystal display device 100 (that is, liquid crystal panel side) is said to be "front surface," "upper surface," or "front side," and the side not facing the viewers of the liquid crystal display device 100 (that is, backlight device side) is said to be "back surface," "rear surface," or "back side."

Referring to FIG. 1 and FIG. 2, a configuration of the liquid crystal display device 100 is described. As shown in FIG. 1, the liquid crystal display device 100 includes a liquid crystal panel 10, and a backlight device 40, which is an external light source disposed on the back side of the liquid crystal panel 10 (a lower side in FIG. 1). The liquid crystal panel 10 and the backlight device 40 are supported integrally by being assembled onto a bezel (frame body) 20.

As shown in FIG. 1 to FIG. 3, the liquid crystal panel 10 has generally rectangular shape as a whole, and has a display region 10a, which is a region having pixels formed in its center to display an image. Also, this liquid crystal panel 10 has a sandwich structure constituted by a pair of transparent glass substrates 11, 12 facing each other, and a liquid crystal layer 13 encapsulated by them. Of the pair of substrates 11, 12, the front side is a color filter substrate (CF substrate) 12, and the back side is an array substrate 11. Here, in the periphery of such glass substrates 11 and 12, a seal material 17 is provided to surround the periphery of the display region 10a. The seal material 17 encapsulates the liquid crystal layer 13. The liquid crystal layer 13 is constituted by a liquid crystal material including liquid crystal molecules. Such a liquid crystal material changes its optical characteristic by having orientation of the liquid crystal molecules manipulated with an application of an electric field between the glass substrates 11, 12. On the inner surfaces that are facing each other of the glass substrates 11, 12, an alignment film (not shown), which determines an orientation direction of each of the liquid crystal molecules, is formed, and on the outer surfaces not facing each other, respective polarizing plates 18, 19 are attached.

In the liquid crystal panel 10, as disclosed, pixels (not shown) for displaying an image are arranged in an array on the front side (the side facing the liquid crystal layer 13) of the array substrate 11, and a plurality of source wirings and gate wirings (not shown) for driving each pixel (sub pixel) are formed to form a lattice pattern. In each region of the lattice surrounded by such wirings, a (sub) pixel electrode and a thin film transistor (TFT), which is a switching element, are provided. The pixel electrode is typically formed of ITO (Indium Tin Oxide), which is a transparent conductive material. Voltages responsive to an image are supplied to these pixel electrodes through the source wirings and through the thin film transistors at predetermined timings.

On the other hand, on the CF substrate 12, one of the color filters (not shown) of R (red), G (green), and B (blue) is facing one of the pixel electrodes on the array substrate 11. Also, a black matrix, which compartmentalizes the color filters of the respective colors, and an opposite electrode (transparent electrode) formed uniformly on the surfaces of the color filters and the black matrix are provided on the CF substrate 12.

Here, the array substrate 11 is formed so as to be larger (in area) than the CF substrate 12. When the two glass substrates 11, 12 are overlapped one over the other, the peripheral portion 11a of at least one side of the four sides that constitute the rectangular periphery of the array substrate 11 slightly protrudes beyond the CF substrate 12 (see FIG. 5 to FIG. 7). On such a protruding peripheral portion 11a, a plurality of flexible boards (TCP: Tape Carrier Package) 14 are disposed side by side. On each of such flexible boards 14, a liquid crystal panel driver IC chip (driver IC chip) (not shown) for driving the liquid crystal panel 10 is mounted. On the flexible board 14 configured as above, by fixing one end to the protruding peripheral portion 11a, the flexible board 14 is connected to electrodes (the pixel electrodes, the opposite electrode, or the like) in the liquid crystal panel 10. Also, the other end of the flexible board 14 is affixed to a connection board 16 on which a controller for controlling the driver IC (chip), other electronic parts, and the like are mounted. In the liquid crystal panel 10 of the present embodiment, as shown in FIG. 1 (also see FIG. 5), the flexible board 14 provided in the liquid crystal panel 10 is fixed to the peripheral portion 11a (that is, a side surface 10c of the liquid crystal panel 10) of one of the four sides, which constitute the rectangular periphery of the array substrate 11. However, a position of the flexible board 14 in the periphery of the array substrate 11 is not limited to this. In the liquid crystal panel 10, the flexible boards 14 may be provided on two sides or on three sides, which constitute the rectangular periphery of the array substrate 11, or on the entire periphery of the array substrate 11.

The connection board 16 is also called "printed circuit board" (PCB: Printed Circuit Board). As shown in FIG. 2, the flexible board 14, which is affixed to the peripheral portion (the protruding peripheral portion 11a of the array substrate 11) of the liquid crystal panel 10, is folded over to a side of a later described backlight device 40. As a result, the connection board 16 is disposed on a side surface part (in a precise sense, a side surface part of outer peripheral sides of a frame 30) of the backlight device 40. The position of the connection board 16 may be on the back side of the backlight device 40.

Here, with respect to the configuration of the liquid crystal panel 10, such as the configuration of the above-described pixels, electrodes, driver circuits and the like, the configuration may be similar to the conventional liquid crystal panel and does not characterize the present invention. Therefore, more detailed description thereof is omitted.

As shown in FIG. 1 and FIG. 2, the backlight device 40 disposed on the back surface side (back side) of the liquid crystal panel 10 is constituted of a plurality of linear light sources (for example, fluorescence tubes, typically cold cathode fluorescence tubes) 42 and a case (chassis) 44 enclosing the light sources 42. The case 44 has a box like shape with an opening facing the front side. Inside the case 44, the light sources 42 are arranged in parallel. A reflective member 46 for reflecting the light from the light sources 42 efficiently toward the viewer side is disposed between the case 44 and the light sources 42.

Also, in the opening of the case 44, a plurality of sheet like optical members 48 are laminated and disposed to cover the opening. An exemplary configuration of the optical members 48 includes, in the order from the side of the backlight device 40 toward the side of the liquid crystal panel 10, a diffusion plate, a diffusion sheet, a lens sheet, and a luminance increasing sheet. However, the configuration is not limited to this combination and order. Further, in order to sandwich and support the optical members 48 using the case 44, a generally rim shaped frame 30 is provided to the case 44. Here, on the back side of the case 44, an inverter circuit substrate (not shown) for mounting an inverter circuit, and an inverter transformer (not shown) as a boosting circuit for supplying power to each of the light sources 42 are provided. However, they do not characterize the present invention. Therefore, more detailed description is omitted.

As described above, the optical members 48 are disposed on the front surface side of the backlight device 40. The frame 30 having the opening at a portion corresponding to the display region 10a of the liquid crystal panel 10 is attached to the front surface side of the optical members 48 to sandwich and support the optical members 48 with the backlight device 40. Also, the liquid crystal panel 10 is disposed on the front surface of the frame 30. Further, the bezel 20 is placed on the front surface side of the liquid crystal panel 10. The liquid crystal panel 10 is typically disposed between the rear surface of a front surface rim part 22 (described below) of the bezel 20 and the frame 30, and is sandwiched and supported through a damping member 50 of the present embodiment.

Figure 4:
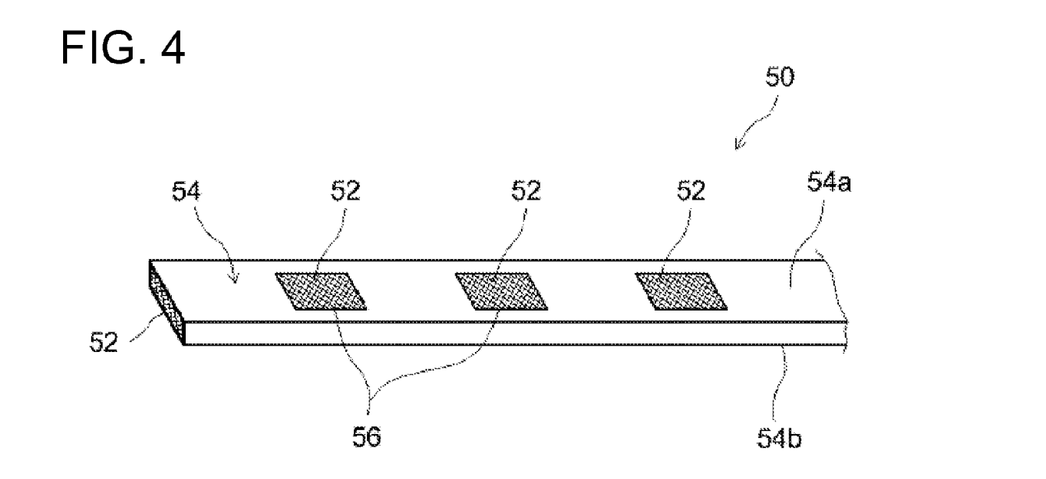
FIG. 4 is a schematic perspective view showing a configuration of a damping member provided in a liquid crystal display device according to an embodiment of the present invention.
Figure 5:
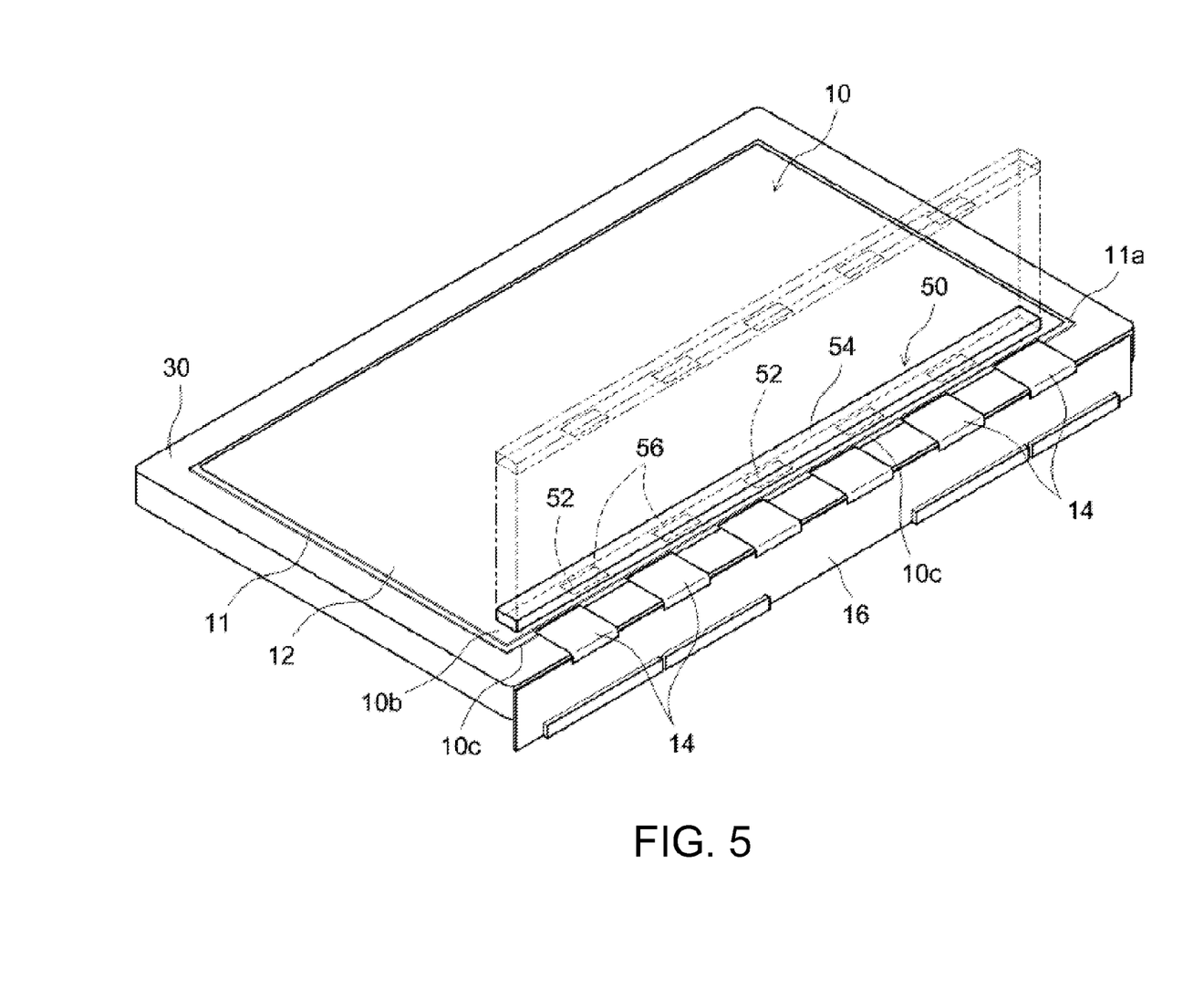
FIG. 5 is a schematic perspective view showing an arrangement of a damping member of an embodiment in a region having electronic parts provided on the periphery of a liquid crystal panel.
Figure 6:
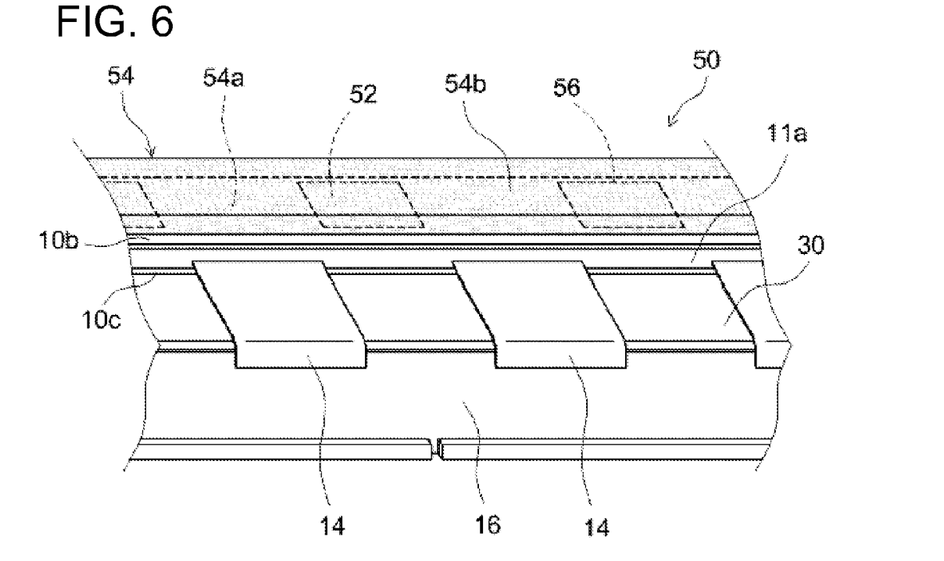
FIG. 6 is an enlarged perspective view showing a primary part of FIG. 5.
Figure 7:
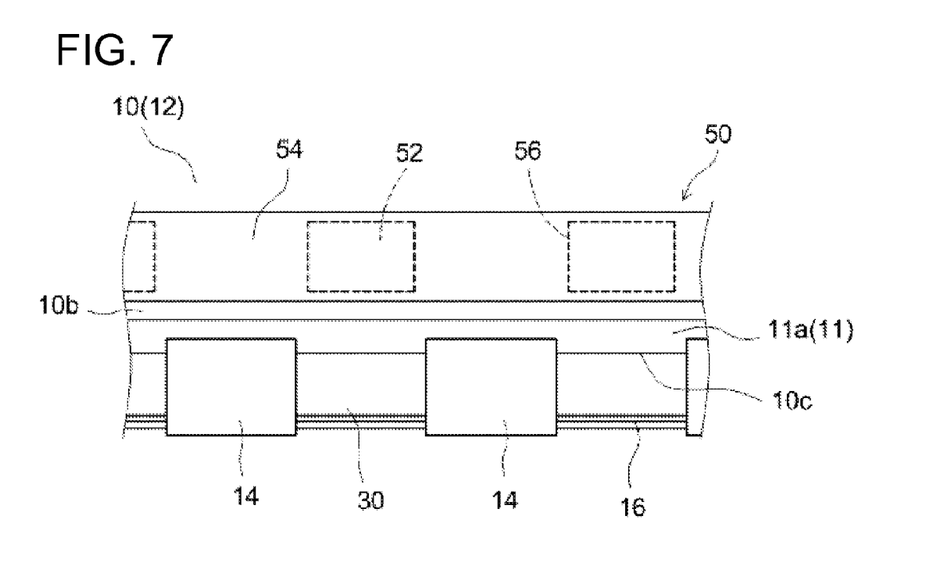
FIG. 7 is an enlarged plan view showing a primary part of FIG. 5.

Next, referring to FIGS. 3 to 7, the configuration and arrangement of a damping member 50 provided in the liquid crystal display device 100 according to the present embodiment are described in detail. FIG. 3 is a schematic cross sectional view showing the periphery of the liquid crystal panel 10 in the liquid crystal display device 100. FIG. 4 is a schematic perspective view showing the configuration of the damping member 50 provided in the liquid crystal display device 100. FIG. 5 is a schematic perspective view showing the arrangement of the damping member 50 in a region of the periphery 10b (of the front surface side) of the liquid crystal panel 10 where the electronic parts (flexible boards 14) are provided. FIG. 6 is an enlarged perspective view of a primary part of FIG. 5. FIG. 7 is an enlarged plan view of a primary part of FIG. 5, and is a schematic view showing a positional relationship of the flexible board 14 and the opening 56 of the damping member 50. Here, in FIG. 5, for convenience, the reduced number of the flexible boards 14 disposed on the liquid crystal panel 10 is shown as compared with what is shown in FIG. 1.

As shown in FIG. 4, the damping member 50 in the present embodiment includes, for example, an elastic body part 52 formed of an elastic body having a flattened rectangular cuboid shape and a conductive covering part 54, which is a covering part covering the elastic body part 52 (typically covering the outer peripheral side surface of the elastic body part in a rolled up manner) and which has conductivity. The elastic body part 52 is preferably constituted of an elastic body that is capable of performing the damping (cushion) function (i.e., the capability to absorb a vibrational impact) and that has a high coefficient of friction to the glass (CF substrate 12 of the liquid crystal panel 10). A preferable example of such an elastic body can be a urethane foam (expanded urethane). For such a urethane foam, for example, a PORON material (PORON (trademark)) can preferably be used. Also, the conductive covering part 54 is preferably constituted of a sheet like conductive material capable of covering the elastic body part 52. For such a conductive material, for example, a conductive fabric (conductive fiber) made of a resin material (fabric, non-fabric, or textile) provided (for example plated) with a metal (for example, copper (Cu) or nickel (Ni)) can preferably be used.

As shown in FIG. 3 and FIG. 4, the damping member 50 is disposed between the rear surface 23 of the front surface rim part 22 of the bezel 20 and the periphery (front surface periphery) 10b on the front surface of the liquid crystal panel 10 in a manner described below. When the damping member 50 is disposed in such a manner, openings 56 are formed on the conductive covering part 54 on a surface 54b of the damping member 50, which is on the side facing the rear surface 23 of the front surface rim part 22, and/or on a surface 54a of the damping member 50, which is on the side facing the above-mentioned front surface periphery 10b (typically, on either one of or both surfaces that are flat among the outer peripheral surfaces of the damping member 50). The elastic body parts 52 are exposed through the openings 56. It is preferable that this exposed elastic body part 52 have a height about the same as the conductive covering part 54 on the periphery of the opening 56 and form a flat surface with the conductive covering part 54 on the periphery. Or, the exposed elastic body part 52 preferably is raised slightly from the conductive covering part 54 on the periphery of the opening 56. Also, as shown in FIG. 4 and FIG. 5, the damping member 50 of the present embodiment has a length corresponding to the length of one side of the side surface 10c of the liquid crystal panel 10. In addition, a plurality of rectangular openings 56 are formed at predetermined intervals on the outer peripheral side surface 54a facing the front surface periphery 10b of the liquid crystal panel 10. However, the surface on which the opening 56 is formed is not limited to this. Besides the outer peripheral side surface 54a, the surface on which the opening 56 is formed may be the outer peripheral side surface 54b, which faces the rear surface 23 of the front surface rim part 22 of the bezel 20 when the damping member 50 is disposed at the position described above. Also, the size and shape of the opening 56 are not particularly limited. However, in order to secure a conductive path from the liquid crystal panel 10 through the conductive covering part 54 to the bezel 20, the opening 56 is preferably formed with a size and a shape that fit inside the outer periphery side surface 54a (or 54b) such that the periphery of the openings 56 does not reach the neighboring outer peripheral side surface by going beyond the outer peripheral side surface 54a (or 54b).

Next, an arrangement of the damping member 50 of the above configuration is described. Here, a case of the damping member 50 arranged on the side surface 10c side of the liquid crystal panel 10 on which electronic parts such as the flexible boards 14 and the like are provided is described as an example. Here, the position where the damping member 50 is arranged is not limited to the side surface 10c. The damping member 50 can be arranged on any of the four sides constituting the side surface part of the liquid crystal panel 10.

The bezel 20 on which such a damping member 50 is arranged can be similar to a conventional bezel and is not particularly limited. For example, as shown in FIG. 1, the bezel 20 is a frame shaped part (in a plan view) formed to rectangularly surround the display region 10a about the center of the front surface of the liquid crystal panel 10, and is typically a metallic part. The bezel 20 is attached to the panel 10 so as to cover and surround the front surface periphery 10b of the liquid crystal panel, as described above. Also, the bezel 20 is configured in such a way as to support the liquid crystal panel 10 with the backlight device 40 integrally.

For the purpose of easy transportation, reducing material costs, and the like, the bezel 20 may be configured by connecting to each other the four pieces of a rim constituting member, which has a cross sectional view of the letter L shape, into a rim form. The bezel 20 is shaped to cover the front surface periphery 10b of the liquid crystal panel 10 as well as the side surfaces of respective sides of the liquid crystal panel 10 (of these sides, the side surface on the side to which the flexible boards 14 are installed is 10c). Also, as shown in FIG. 3, the bezel 20 has a front surface rim part 22, which is rim shaped (frame shaped) in a plan view, disposed on the front surface periphery 10b of the liquid crystal panel 10. Also, the bezel 20 has a side surface rim part 24, which is continuing from the outer periphery of the front surface rim part 22 and extending perpendicularly, and which is disposed to the side surfaces of the four sides including the side surface 10c of the liquid crystal panel 10.

As shown in FIG. 3 and FIG. 5 to FIG. 7, the damping member 50 is sandwiched and disposed between the rear surface 23 of the front surface rim part 22 of the bezel 20, as configured above, and the front surface periphery 10b of the liquid crystal panel 10. The damping member 50 is preferably disposed in a position without being exposed from the inner periphery of the front surface rim part 22. Here, the damping member 50 is disposed such that the outer peripheral side surface 54a where the openings 56 are formed is facing the front surface periphery 10b of the liquid crystal panel 10 and both are in contact with each other, and such that the surface 54b of the back side of the outer peripheral side surface 54a is facing the rear surface 23 of the front surface rim part 22 of the bezel 20 and both are in contact with each other. With this structure, the elastic body part 52 exposed from the opening 56 is in contact with the front surface periphery 10b of the liquid crystal panel 10 (here, if the opening 56 is also formed on the outer peripheral side surface 54b, the elastic body part 52 exposed from the opening 56 is also in contact with the rear surface 23 of the front surface rim part 22).

This way, the frictional force acting on the contact portion of the elastic body part 52 exposed from the opening 56 and the front surface periphery 10b is typically far larger compared with a contact area of the front surface periphery 10b and the conductive covering part 54 at which the elastic body part 52 is not exposed. Thus, because of the contact between the exposed elastic body part 52 and the front surface periphery 10b of the liquid crystal panel 10, the damping member 50 is unlikely to slip out of the position where the damping member 50 is disposed. Accordingly, the damping member 50 can maintain the desired arrangement for a long period of time even after transportations and vibrational tests of the liquid crystal display device 100.

Here, the outer peripheral side surface 54b may be in direct contact with the rear surface 23 of the front surface rim part 22 of the bezel 20. Or the damping member 50 may be fixed to the bezel 20 by having it attached to the rear surface 23 through a double-sided tape or the like. The liquid crystal panel 10 typically has a clearance. Because of this, the liquid crystal panel 10 can move slightly while being sandwiched and supported between the bezel 20 and the frame 30. Here, in case that the damping member 50 is fixed to the bezel 20, the liquid crystal panel 10 comes in contact with the damping member 50 fixed to the bezel 20 of the liquid crystal panel 10 in the manner as described above. This is preferable because movement of the liquid crystal panel 10 is effectively suppressed.

Also, by having the damping member 50 arranged as above, the liquid crystal panel 10 and the bezel 20 are electrically connected through the conductive covering part 54 of the damping member 50, and a good conductive path from the liquid crystal panel 10 to the bezel 20 is formed. Therefore, the damping member 50 can effectively prevent EMI and/or ESD.

Also, as shown in FIG. 6 and FIG. 7, the damping member 50, when disposed in the position as described above, is arranged so that the openings 56 do not touch the flexible boards 14. Further, the damping member 50 is arranged so that the conductive covering part 54 that does not have the openings 56 is in contact with or adjacent to the flexible boards 14 (or electronic parts including the flexible boards 14). As shown in FIG. 6 and FIG. 7, the damping member 50 of the present embodiment is arranged in such a way that the openings 56, which are lined up at predetermined intervals on the outer peripheral side surface 54a of the damping member 50, correspond to the regions between the plurality of flexible boards 14, which are lined up on the side surface 10c (the peripheral portion 11a of the array substrate 11) of the liquid crystal panel 10. Also, the damping member 50 is arranged so that the regions of the conductive covering part 54 between the plurality of openings 56 correspond to the flexible boards 14, respectively.

By having the damping member 50 arranged as described above, electrical charges accumulated in the liquid crystal panel 10, for example, can flow to the bezel 20 through the conductive covering part 54 with a high probability. Therefore, the possibility of having the electrical charges flowing to the flexible boards 14 (and to the connection board 16 connected to the boards 14) by missing the conductive path toward the bezel 20 through the conductive covering part 54 becomes extremely low. Accordingly, electronic parts, such as the flexible boards 14, the connection board 16, and the like, being damaged by EMI and ESD can be prevented even more securely.

The method of arranging the damping member 50, as described above, may be similar to a method of arranging a conventional damping member to the back side (rear surface of the front surface rim part) of a conventional bezel, and is not particularly limited. As an example, initially, the outer peripheral side surface 54b of the damping member 50 is disposed (fixed) on the rear surface 23 of the front surface rim part 22. Next, the bezel 20 provided with the damping member 50 is attached to the front surface of the liquid crystal panel 10 disposed on the frame 30. This way, the damping member 50 can be sandwiched between the rear surface 23 and the front surface periphery 10b of the liquid crystal panel 10. As another example, as shown in FIG. 5, initially, the liquid crystal panel 10 is disposed on the frame 30, and the damping member 50 is disposed on (the front surface of) the front surface periphery 10b of the liquid crystal panel 10. Here, as for the direction of the damping member 50, it is disposed so that the outer peripheral side surface 54a where the openings 56 are formed is facing downward (that is, the outer peripheral side surface 54a is facing and touching the liquid crystal panel 10). Next, the bezel 20 is mounted from the front surface side of the liquid crystal panel 10.

As described above, the damping member 50, which has the function of preventing EMI and/or ESD in addition to the conventional damping (cushion) function, and which is unlikely to slip out of the predetermined arrangement position, can be disposed on the liquid crystal panel 10.

Here, the method of configuring the liquid crystal display device 100 in the present embodiment may be similar to a conventional configuration method and is not particularly limited. For example, as described above, after the liquid crystal panel 10 is disposed on the frame 30, the optical members 48 and the backlight device 40 enclosed in the case 44 are attached to the rear surface side of the frame 30. Further, by disposing the bezel 20 having the damping member 50 arranged thereon to the front surface side of the liquid crystal panel 10, the liquid crystal panel 10 is sandwiched and supported with the frame 30, and the liquid crystal panel 10, the frame 30, and the backlight device 40 as a whole are assembled. This way, the liquid crystal display device 100 can be configured.

Preferred embodiments of the present invention are described above. However, these descriptions are not limiting items, and of course, various modifications are possible. For example, the damping member 50 in the above embodiments has the length similar to the side surface 10c of the liquid crystal panel 10, and one damping member 50 is disposed on one side of the side surface 10c. As a damping members of another embodiment, for example, a configuration may have a plurality of damping members disposed on one side of the side surface 10c.

Also, in the above-described embodiments, a liquid crystal display device was described as a typical example of a display device. However, the present invention can be applied to various types of display devices provided with a similar structural arrangement including a panel and a bezel.

INDUSTRIAL APPLICABILITY

According to the present invention, a suitable display device including the damping member, which, in addition to having the primary damping capability of damping a vibrational impact to the display panel, does not easily slip out of the predetermined position, and has the function of preventing EMI and/or ESD, can be realized.

DESCRIPTION OF REFERENCE CHARACTERS 10 liquid crystal panel
10a display region
10b front surface periphery
10c side surface
11 array substrate
11a protruding peripheral portion
12 color filter (CF) substrate
13 liquid crystal layer
14 flexible board (TCP)
16 connection board
17 seal material
18, 19 polarizing plates
20 bezel
22 front surface rim part
24 side surface rim part
30 frame
40 backlight device
42 light source
44 case
46 reflective member
48 optical member
50 damping member
52 elastic body part
54 conductive covering part
56 opening
100 liquid crystal display device

The invention claimed is:

1. A display device comprising:
a display panel;
a frame shaped bezel mounted so as to surround a periphery of the panel on a front surface side of the display panel; and
a damping member disposed between a front surface of the periphery of the display panel and a rear surface of the bezel facing said front surface,
wherein the damping member includes an elastic body part made of an elastic body and a conductive covering part that covers the elastic body part and that has conductivity,
wherein an opening from which the elastic body part is exposed is formed in at least a part of one of a surface of the damping member that faces the rear surface of the bezel and in a surface thereof that faces the front surface of the periphery of the display panel, and
wherein the damping member, when disposed to be sandwiched between the front surface of the periphery of the display panel and the rear surface of the bezel, is configured in such a manner that the elastic body part exposed from the opening is brought into contact with one of the rear surface of the bezel and the front surface of the periphery of the display panel.

2. The display device according to claim 1, wherein, in the periphery of the display panel, at least one electronic part is provided in an area adjacent to or in contact with the damping member that is disposed to be sandwiched between the front surface of said periphery and the rear surface of the bezel, and
wherein the damping member, when disposed to be sandwiched between the front surface of the periphery of the display panel and the rear surface of the bezel, is configured in such a manner that the conductive covering part is in contact with or come close to the electronic part, and the opening is not in contact with the electronic part.

3. The display device according to claim 2, wherein on a surface of the damping member facing the front surface of the periphery of the display panel, a plurality of the openings are formed in positions which are not in contact with the electronic part, and
wherein the damping member, when disposed to be sandwiched between the front surface of the periphery of the display panel and the rear surface of the bezel, is configured in such a manner that elastic body parts respectively exposed from the plurality of the openings are brought into contact with the front surface of the periphery of the display panel.

4. A damping member for a display device having a display panel and a frame shaped bezel disposed to surround a periphery of the panel on a front surface side of the display panel, the damping member being configured to be mounted between a front surface of the periphery of the display panel and a rear surface of the bezel facing the front surface, the damping member comprising:
an elastic body part made of an elastic body; and
a conductive covering part that covers the elastic body part and that has conductivity,
wherein in the damping member, an opening from which the elastic body part is exposed is formed in at least a part of one of a surface that faces the rear surface of the bezel and a surface thereof that faces the front surface of the periphery of the display panel, and
wherein the damping member, when disposed to be sandwiched between the front surface of the periphery of the display panel and the rear surface of the bezel, is configured in such a manner that the elastic body part exposed from the opening can be brought into contact with one of the rear surface of the bezel and the front surface of the periphery of the display panel.

5. The damping member according to claim 4,
wherein the damping member is configured to be mounted in the display device in which at least one electronic part is provided on the periphery of the display panel, and
wherein the damping member, when disposed to be sandwiched between the front surface of the periphery of the display panel and the rear surface of the bezel, is configured in such a manner that the conductive covering part is in contact with or come close to the electronic part, and the opening is not in contact with the electronic part.

6. The damping member according to claim 4,
wherein the damping member is configured to be mounted in the display device in which at least one electronic part is provided on the periphery of the display panel,
wherein in the damping member, a plurality of the openings are formed in positions not in contact with the electronic part on a surface facing the front surface of the periphery of the display panel, and
wherein the damping member, when disposed to be sandwiched between the front surface of the periphery of the display panel and the rear surface of the bezel, is configured in such a manner that the elastic body parts respectively exposed from the plurality of the openings can be brought into contact with the front surface of the periphery of the display panel.

* * * * *